United States Patent [19]

Roels

[11] Patent Number: 4,744,135
[45] Date of Patent: May 17, 1988

[54] ALIGNMENT ADJUSTMENT TOOL FOR A VEHICLE DOOR

[76] Inventor: Jacques Roels, 506 Pittsburg Avenue, Selkir, Manitoba, Canada, R1A 0A9

[21] Appl. No.: 936,392

[22] Filed: Dec. 1, 1986

[51] Int. Cl.[4] ............................................. B23P 19/04
[52] U.S. Cl. ......................................... 29/267; 29/271
[58] Field of Search .................. 29/267, 271; 254/131, 254/113, 120

[56] References Cited

U.S. PATENT DOCUMENTS

| 3,015,883 | 1/1962 | Brown | 29/271 |
| 4,464,819 | 8/1984 | Steck et al. | 29/267 |
| 4,567,634 | 2/1986 | Landry | 29/267 |

FOREIGN PATENT DOCUMENTS

| 210588 | 2/1924 | United Kingdom | 29/267 |

OTHER PUBLICATIONS

Mac Tools, pp. 333 & 334.

Primary Examiner—Robert C. Watson
Attorney, Agent, or Firm—Adrian D. Battison; Stanley G. Ade; Murray E. Thrift

[57] ABSTRACT

A tool for adjusting the alignment of a vehicle door within its opening comprises a plate which has a recess at one end for engaging over the striker pin on the door jam and a second pin at a rearward end for engaging into the lock mechanism of the door. The plate is slightly cranked and of a sufficient length so that the door when the pin is engaged in the lock mechanism is held slightly ajar with the recess presented over the striker pin so that the pin can pivot about that recess. A hex rod extends outwardly from the surface in an opposed direction and is inclined slightly away from the forward end so that a wrench can be engaged over the hex rod to extend around the flange of the door with the free end of the wrench lying substantially in the plane of the plate member.

6 Claims, 2 Drawing Sheets

ALIGNMENT ADJUSTMENT TOOL FOR A VEHICLE DOOR

BACKGROUND OF THE INVENTION

This invention relates to a tool for use in aligning a vehicle door.

It is a common problem in motor vehicles that the hinged door is either misaligned during the initial manufacture or tends to sag as the vehicle becomes older so that it does not properly close without binding of the door at one edge of its opening.

It will be appreciated that vehicle doors generally close an opening in the vehicle body which has inwardly facing surfaces generally at right angles to the opening with the door also having such surfaces which, when the door is closed, lie closely adjacent and parallel to the surfaces of the opening. In addition, the door generally has a flange around the outer faces at the outer edge of the door to close against the vehicle body.

When the door is misaligned or sags, one of the outer faces of the door tends to bind against the corresponding face of the opening thus inhibiting the proper closing of the door.

Generally the manner of overcoming this misalignment is for the mechanic to apply force to the door to improve its alignment in the opening. This can be done generally by the crude methods of applying a lever beneath the door which is then pulled upwardly to force against the under edge of the door and physically lift it upwardly to distort the hinges. This can often leave an indentation in the lower edge which quickly loses the protective paint covering and allows the door to rust. In other cases the same technique is used but is carried out using a jack which applies force to the underside of the door with the same damaging results.

It is one object of the present invention to provide an improved alignment tool which can be used to apply force to the door without the danger of damaging the surface of the door.

According to the invention, therefore, there is provided an alignment adjusting tool for use with a vehicle door in a vehicle of the type comprising a door mounted on vertical hinges along one side of an opening so as to pivot from an open position to close the opening, the opening including a face opposite the hinges and facing inwardly toward the hinges, a striker pin extending outwardly from the face toward the hinges, the door including a face arranged with the door closed to lie closely adjacent and substantially parallel to said face of said opening and a lock recess in said face of said door for receiving said pin into a lock mechanism within the door in a locking action, the tool comprising a plate member having a recess at a forward end thereof shaped to be received onto said pin at a base of the pin adjacent said face so as to extend at least partly therearound and a pin member extending outwardly from one side of the plate member at a position thereon spaced from said recess by a distance greater than the distance between said pin and an outer edge of said face of said opening, the pin member being shaped substantially the same as the pin so as to be engageable with said lock, said plate member being shaped such that with said recess engaged over said pin, said pin member can engage into said lock recess, and means on said plate member by which a force can be applied thereto in a vertical direction at a position spaced from said recess so as to pivot said plate member about said recess to raise or lower said door.

The tool, therefore, is of a simple construction with a forward end thereof being arranged to engage the pin of the opening and a rearward end thereof having a replacement pin for engaging the lock. The leverage force therefore is applied around the door striker pin and is applied directly to the lock mechanism both of which are manufactured sufficiently strongly to accommodate vigorous closing of the door and hence can accommodate the necessary forces applied to distort the door hinges.

Preferably the pin member is arranged at an end of the plate member with the leverage being applied to the plate member by a hexagonal rod which extends outwardly from the rear surface of the plate member for engagement by a wrench. The extent of the rod member is sufficient that the wrench thus clears the flange of the door in extending outwardly beyond the door a sufficient distance to allow leverage on the door. The rod is angled slightly away from the recess of the forward end in order that the wrench thus extends back toward the plane of the plate member so that the force is applied in line with the plate member to prevent twisting.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like character of reference indicate corresponding parts in the different figures.

DETAILED DESCRIPTION

Figure 1:
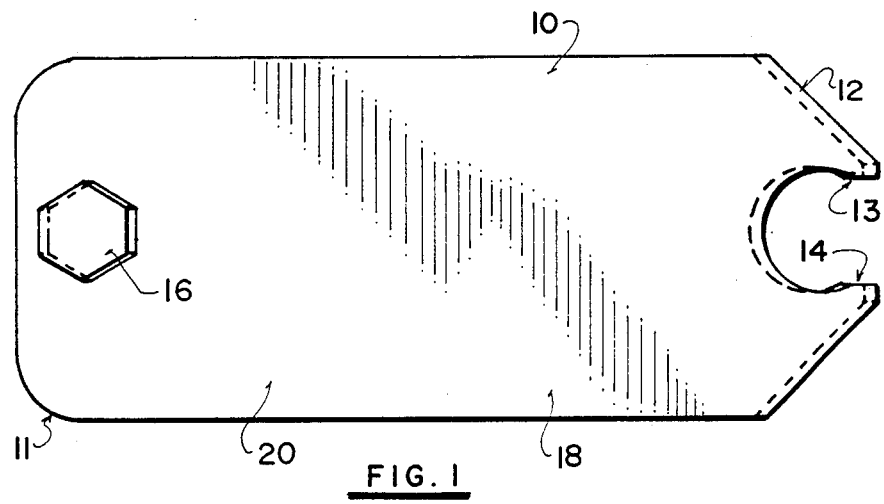
FIG. 1 is a side elevational view of the alignment tool according to the invention.
Figure 2:
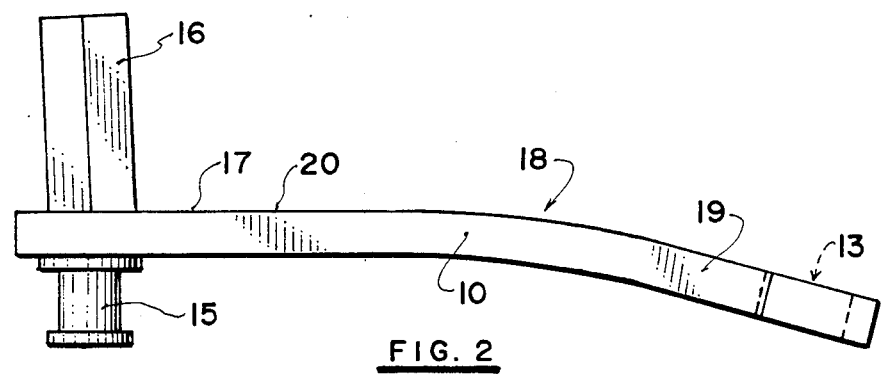
FIG. 2 is a top plan view of the tool of FIG. 1.
Figure 3:
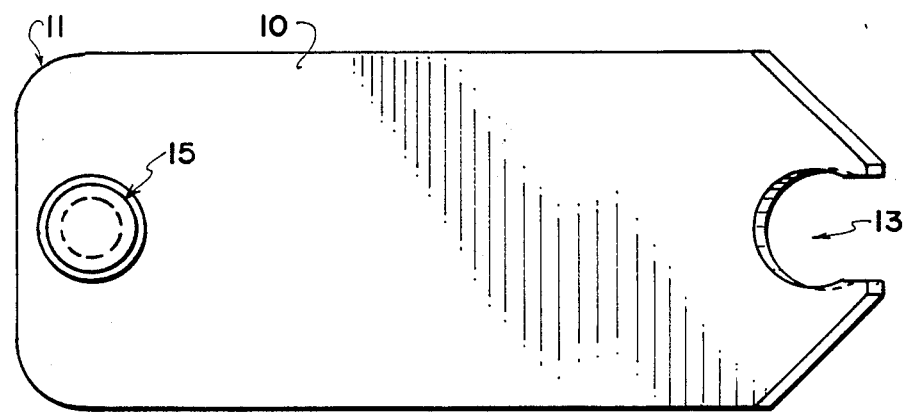
FIG. 3 is a side elevational view of the other side of the tool.

The tool comprises a plate member 10 which is generally rectangular and is cut from metal of the order of ¼" to ½" thick which provides sufficient strength for the leverage as explained hereinafter. Rear corners of the plate member are chamferred at 11 for aesthetic reasons and forward corners incline inwardly as indicated at 12 toward a recess 13 provided at a forwardmost apex of the plate member. The recess is part circular extending approximately through 200° of arc with a short inlet portion defined by parallel sides 14.

At a rear end of the plate member arranged substantially centrally thereof is provided on one surface a pin member generally indicated at 15. On the other surface extending outwardly to the opposed side is a rod member 16 which is of hexagonal or other suitable polygonal cross section for engagement by a wrench. The axis of the rod member is inclined to the adjacent surface indicated at 17 of the plate member in a direction slightly away from the recess 13.

A central portion of the plate member as indicated at 18 is slightly cranked so that a portion 19 adjacent the recess 13 lies at a shallow angle to a portion 20 adjacent the pin member 15 and the rod 16.

Figure 4:
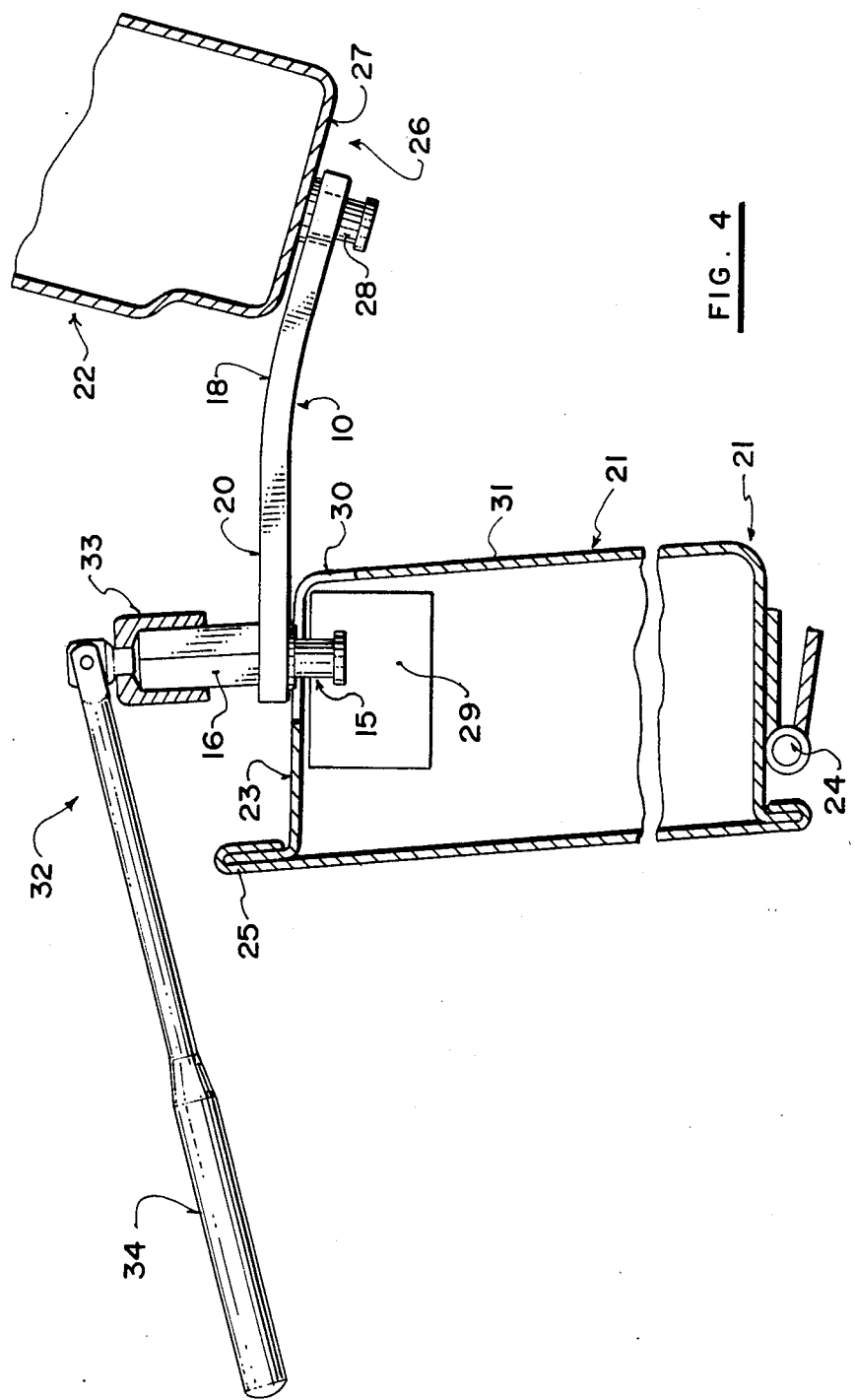
FIG. 4 is a top plan view of the tool in an operating position relative to the door of a vehicle.

Turning now to FIG. 4, a vehicle door is indicated generally at 21 to be received in an adjacent portion 22 of the vehicle body. The door 21 includes an outer face 23 which lies on an opposed side from a schematically indicated hinge 24. A flange 25 is positioned at the outer face 23 on the outer edge of the door in conventional manner. Similarly the opening generally indicated at 26 includes an outer face 27 opposite to the hinges so that when the door is closed the surfaces 23 and 27 lie in closely adjacent substantially parallel relation.

The conventional door lock arrangement comprises a pin 28 which extends outwardly from the face 27 toward the hinges. This cooperates with a lock mechanism schematically indicated at 29 on the door with a recess 30 provided in the outer face 23 and in a rear face 31 to allow the pin 28 to enter the lock mechanism 29 as the door is closed with the lock mechanism conventionally grasping the pin to hold the door closed.

In operation the tool according to the invention is firstly slid into position with the recess 13 extending around the pin 28. The diameter of the recess 13 is chosen such that it would loosely grasp the pin 28 and will allow the plate member to rotate around the pin 28 with the peripheral wall surrounding the recess acting as a bearing surface on the pin 28.

The door can then be carefully closed onto the tool so that the pin 15 engages into the lock mechanism in place of the pin 28. The distance between the pin 15 and the recess 13 is arranged such that, when so engaged, the door remains slightly ajar with a distance of approximately 2 to 6 inches between the inner surface of the door and the outer surface of the vehicle.

The crank 18 in the plate member allows the plate member to extend from the pin in a direction slightly away from the hinges so that the portion 20 of the plate member can extend around the outer surface 23 without binding. In other words the crank 18 takes up the thickness of the plate member so as to present the pin 15 in approximately required position so that it simply engages the lock mechanism without distorting the position of the recess on the pin 28 and in addition it curves the plate back toward the door lock to take up or follow the arc of the movement of the door lock around the hinges.

With the pins so engaged the wrench indicated at 32 can be engaged over the rod 16 so that a hex socket 33 of the wrench firmly engages the hex rod 16 to allow the application of torque thereto. The wrench and rod thus form a two-portion lever arrangement with the rod member forming the first portion extending outwardly from said opposed side of the plate member in a direction generally opposite to said pin member and the wrench forming a second portion extending therefrom in a direction generally away from said forwardmost apex. The inclination of the rod member causes the wrench to incline from the rod member so as to intersect a straight line joining a recess 13 and the pin member 15. It will be noted that the slight inclination of the axis of the rod 16 allows the shank 34 of the wrench to extend back toward the plane of the portion 20 of the plate member so that the hand of a user grasping the wrench 34 applies force thereto at a position substantially in line with or in the same plane as the plate member and particularly the portion 20 so as to prevent twisting the unit. While the wrench does not form an integral part of the tool, it is clear that the tool cannot be operated without the wrench and hence the wrench and tool form a combination in operation which cooperate together to obtain the required result.

With the wrench so applied, the force can be applied to the wrench in a vertical direction either upwardly or downwardly depending upon requirements in order to distort the door or door hinges in the direction required to align the top edge of the door with the top edge of the opening. In view of the positioning of the door slightly ajar it is easy to see the top edges so that the proper alignment can be achieved without difficulty.

The application of force to the door is therefore applied through the lock mechanism which is of sufficient strength to accommodate those forces without in any way damaging the door in a manner which may require repair to the protective coating.

Since various modifications can be mae in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An alignment adjusting tool for use with a vehicle door in a vehicle of the type comprising a door mounted on vertical hinges along one side of an opening so as to pivot from an open position to close the opening, the opening including a face opposite the hinges and facing inwardly toward the hinges, a door lock striker pin extending outwardly from the face toward the hinges, the door including a face arranged with the door closed to lie closely adjacent and substantially parallel to said face of said opening and a lock recess in said face of said door for receiving said door lock striker pin into a lock mechanism within the door in a locking action, the tool comprising a first and a second side face, the tool member having an upper edge, a lower edge and a forward edge, a recess defined in said forward edge and shaped to be received onto said door lock striker pin at a base of the door lock striker pin adjacent said face so as to extend at least partly therearound a tool pin member rigidly mounted on and extending outwardly from said first side face of the tool member at a position thereon spaced from said recess by a distance greater than the distance between said door lock striker pin and an outer edge of said face of said opening, said tool pin member being shaped substantially the same as the door lock striker pin so as to be engageable with said lock mechanism, said tool member being shaped such that with said recess engaged over said door lock striker pin, said tool pin member can engage into said lock mechanism and lever means including a first portion extending outwardly from said second side surface in a direction generally opposite to said tool pin member and a second portion extending from said position in a direction generally away from said forward edge and inclined from said first portion so as to intersect a straight line joining said recess and said tool pin member.

2. The invention according to claim 1 wherein said tool pin member and said lever means are arranged at an end of said tool member remote from said forward edge.

3. The invention according to claim 1 wherein said second side face of said tool member is cranked so that a portion thereof adjacent the forward edge lies at a shallow angle to a portion thereof adjacent said lever means.

4. An alignment adjusting tool for use with a vehicle door in a vehicle of the type comprising a door mounted on vertical hinges along one side of an opening so as to pivot from an open position to close the opening, the opening including a face opposite the hinges and facing inwardly toward the hinges, a door lock striker pin extending outwardly from the face toward the hinges, the door including a face arranged with the door closed to lie closely adjacent and substantially parallel to said face of said opening and a lock recess in said face of said door for receiving said door lock striker pin into a lock mechanism within the door in a locking action, the tool comprising a first and a second side face, the tool member having an upper edge, a lower edge and a forward edge, a recess defined in said forward edge and shaped to be received onto said door lock striker pin at a base of the door lock striker pin adjacent said face so as to extend at least partly therearound, a tool pin member rigidly mounted on and extending outwardly from said first side face of the tool member at a position thereon spaced from said recess by a distance greater than the distance between said door lock striker pin and an outer edge of said face of said opening, said tool pin member being shaped substantially the same of the door lock striker pin so as to be engageable with said lock mechanism, said tool member being shaped such that with said recess engaged over said door lock striker pin, said tool pin member can engage into said lock mechanism, a rod member having a cross-section of a regular polygon for engagement of the rod member by a wrench, said rod member extending outwardly from said second side face in a direction generally opposite to said tool pin member to an exposed end of the rod member, said rod member having a longitudinal axis of symmetry which is inclined to said second side face in a direction away from said forward edge such that an end of the wrench remote from the rod member intersects a straight line joining said recess and said tool pin member.

5. The invention according to claim 4 wherein said tool pin member and said rod member are arranged at an end of said tool member remote from said forward edge.

6. The invention according to claim 4 wherein said first side surface of said tool member is cranked so that a portion thereof adjacent the forward edge lies at a shallow angle to a portion thereof adjustment said tool pin member.

* * * * *